United States Patent
Kim

(10) Patent No.: US 8,122,639 B2
(45) Date of Patent: Feb. 28, 2012

(54) MULCH SHEET AND METHOD OF MANUFACTURE

(75) Inventor: Youn-Soo Kim, Andong-si (KR)

(73) Assignees: Jong Seong Kim, Andong (KR); Young Won Kim, Andong (KR)

( * ) Notice: Subject to any disclaimer, the term of this patent is extended or adjusted under 35 U.S.C. 154(b) by 212 days.

(21) Appl. No.: 12/664,876

(22) PCT Filed: Jun. 13, 2008

(86) PCT No.: PCT/KR2008/003323
§ 371 (c)(1),
(2), (4) Date: Dec. 15, 2009

(87) PCT Pub. No.: WO2008/153344
PCT Pub. Date: Dec. 18, 2008

(65) Prior Publication Data
US 2010/0180493 A1      Jul. 22, 2010

(30) Foreign Application Priority Data
Jun. 15, 2007      (KR) ........................ 10-2007-0058897

(51) Int. Cl.
*A01G 13/02*      (2006.01)
(52) U.S. Cl. ...................................................... 47/32.3
(58) Field of Classification Search ............... 47/1.01 R, 47/9, 20, 56, 58.1 R, 58.1 FV
See application file for complete search history.

(56) References Cited

U.S. PATENT DOCUMENTS

| | | | | |
|---|---|---|---|---|
| 4,414,776 A | * | 11/1983 | Ball | 47/56 |
| 5,251,398 A | | 10/1993 | Balassa | |
| 6,029,395 A | * | 2/2000 | Morgan | 47/9 |
| 7,752,804 B2 | * | 7/2010 | Spittle et al. | 47/9 |
| 7,788,847 B1 | * | 9/2010 | Holt et al. | 47/9 |
| 2005/0178056 A1 | * | 8/2005 | Morrone | 47/9 |
| 2006/0070294 A1 | * | 4/2006 | Spittle | 47/9 |
| 2006/0070295 A1 | * | 4/2006 | Huang et al. | 47/9 |
| 2006/0117653 A1 | * | 6/2006 | Werth | 47/56 |
| 2006/0150476 A1 | * | 7/2006 | McCrory et al. | 47/32 |
| 2010/0180493 A1 | * | 7/2010 | Kim | 47/9 |

FOREIGN PATENT DOCUMENTS

| | | | | |
|---|---|---|---|---|
| JP | 06-184896 | | | 7/1994 |
| JP | 08154502 | A | * | 6/1996 |
| JP | 2000224903 | A | * | 8/2000 |
| KR | 96-004330 | | | 4/1996 |
| KR | 2003-61057 | | | 7/2003 |
| KR | 2004018681 | A | * | 3/2004 |

* cited by examiner

*Primary Examiner* — Frank T Palo
(74) *Attorney, Agent, or Firm* — Mannava & Kang, PC

(57) ABSTRACT

A method for manufacturing a functional mulching film for rice direct seeding, and a mulching film manufactured by the same method. The mulching film is installed in a paddy field and formed to suppress weed growth and contains a fertilizer for enhancing rice growth and a powder ore for reinforcing the fertility of the soil.

2 Claims, 2 Drawing Sheets

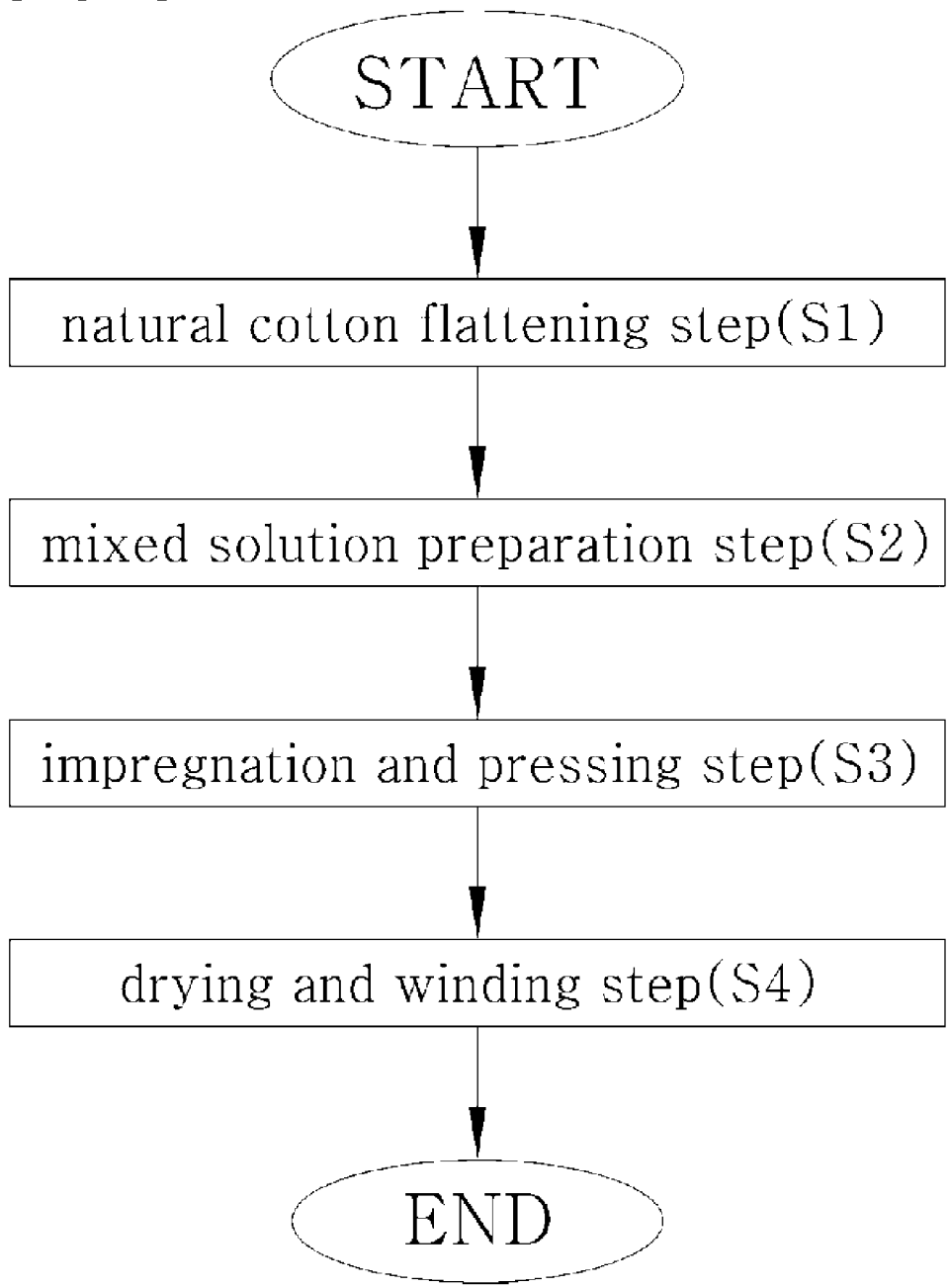
[Fig. 1]

[Fig. 2]
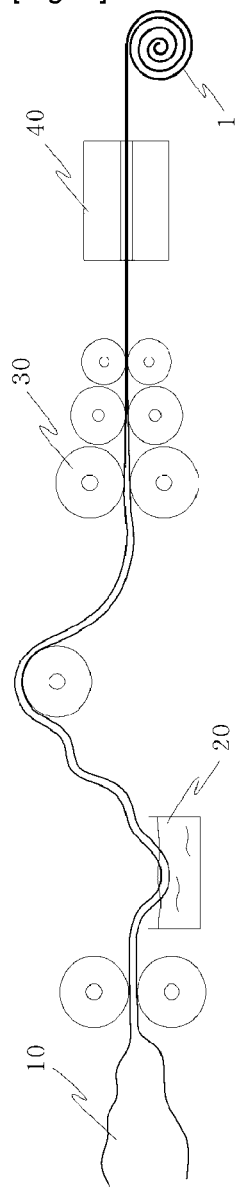
[Fig. 3]
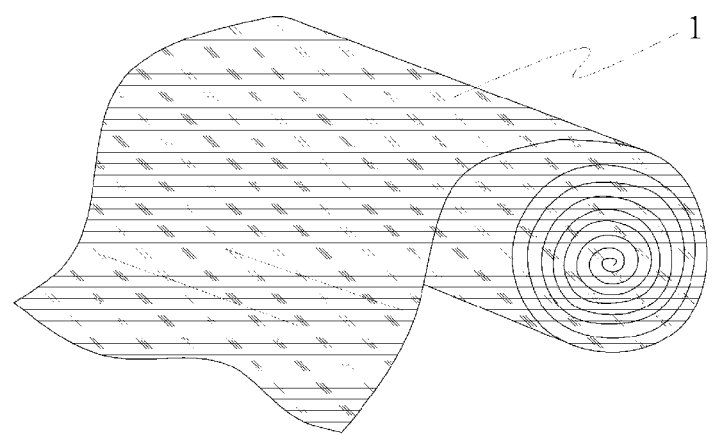

MULCH SHEET AND METHOD OF MANUFACTURE

TECHNICAL FIELD

The present invention relates to a method for manufacturing a mulching film, and a mulching film manufactured by the same method, and more particularly, to a method for manufacturing a functional mulching film for rice direct seeding that is installed in a paddy field and formed to suppress weed growth and contains a fertilizer for enhancing rice growth and a powder ore for reinforcing the fertility of the soil, and a mulching film manufactured by the same method.

BACKGROUND ART

Generally, a mulching film is for maintaining a temperature required for growth and development immediately after the seeding of crops and for preventing weed growth by the use of nutrients to be supplied to crops seeded in the surrounding farmland. This mulching film is not naturally decomposed by microbes because it is an opaque material made from synthetic resin, and it should be removed separately after construction after a predetermined period of time. Such a removal operation acts as a cause for imposing a burden on farmers because this causes a labor shortage in the busy farming season in view of the reality of farming villages. Further, the removed waste mulching film will be recycled, or, if collection is not properly done, will be incinerated in farming villages. However, there is a serious problem of causing environmental pollution since a large amount of environmental pollutants is generated in the incineration process.

To resolve the aforementioned problems, Korean Registered Patent Publication No. 429784 previously applied by this application will be explained, which discloses the manufacture of a stack of 80% cotton, 4.5% animal glue, 4.5% vegetable glue, 10% starch, and 1% enzyme preparation.

The prior art mulching film was advantageous in that it is capable of natural decomposition, however, it is often the case the mulching film hangs down when installed on the ground and hence is not precisely installed on the ground, and it breaks often due to its weak strength.

Moreover, when a fertilizer is applied to reinforce the fertility of the soil after installing the mulching film on the ground, the fertilizer does not soak into the ground until all the mulching film is naturally decomposed, thereby failing to help in plant growth.

DISCLOSURE OF INVENTION

Technical Problem

The present invention has been made in an effort to solve the foregoing problems, and it is an object of the present invention to reinforce the strength of a mulching film so as to avoid the mulching film from hanging down or breaking when installed on the ground by manufacturing the mulching film in a manner that natural cotton is impregnated in a mixed solution of a concentrated liquid extracted from animal glue and seaweeds, a fertilizer, a powder ore, and starch, and then pressed by a press roller and dried.

It is another object of the present invention to reduce the labor of fertilizer application by containing a fertilizer and a powder ore at a predetermined ratio in a mulching film, and to further increase efficiency because the fertility of the soil can be reinforced by the powder ore.

Technical Solution

A method for manufacturing a functional mulching film for rice direct seeding is manufactured roughly in four steps, and comprises: a natural cotton flattening step S1 of processing 100% natural cotton in a felt-like form so as to have a predetermined width, breadth, and thickness; a mixed solution preparation step S2 of preparing a mixed solution comprised of 33.3% by weight of animal glue, 33.3% by weight of concentrated liquid of kelp, 13.4% by weight of fertilizer, 13.4% by weight of powder ore, and 6.6% by weight of starch; an impregnation and molding step S3 of impregnating the produced natural cotton in the mixed solution and then pressing the same by a press roller; and a drying and winding step S4 of drying the impregnated and pressed mulching film by a drier and then winding the same in a roll shape. The animal glue, concentrated liquid of kelp, fertilizer, powder ore, and starch are contained in the natural cotton at a predetermined ratio.

Advantageous Effects

The present invention can reinforce the strength of a mulching film so as to avoid the mulching film from hanging down or breaking when installed on the ground and can make natural decomposition easier by manufacturing the mulching film in a manner that natural cotton is impregnated in a mixed solution of a concentrated liquid extracted from animal glue and seaweeds, a fertilizer, a powder ore, and starch, and then pressed by a press roller and dried.

Furthermore, it is possible to reduce the labor of fertilizer application by containing a fertilizer and a powder ore at a predetermined ratio in a mulching film, and to further increase efficiency because the fertility of the soil can be reinforced by the powder ore.

BRIEF DESCRIPTION OF THE DRAWINGS

FIG. 1 is a process sequence diagram according to the present invention;

FIG. 2 is a view of a manufacturing process according to the present invention; and FIG. 3 is a perspective view of a mulching film manufactured according to the present invention.

BEST MODE FOR CARRYING OUT THE INVENTION

The present invention involves a method for manufacturing a functional mulching film for rice direct seeding and a mulching film manufactured by the same method. This mulching film is characterized in that it is installed in a paddy field and formed to suppress weed growth and contains a fertilizer for enhancing rice growth and a powder ore for reinforcing the fertility of the soil.

Mode for the Invention

Hereinafter, an embodiment of the present invention will be described below.

FIG. 1 is a process sequence diagram according to the present invention. FIG. 2 is a view of a manufacturing process according to the present invention. FIG. 3 is a perspective view of a mulching film manufactured according to the present invention. As shown in the drawings, the present invention is manufactured in four steps.

First, in the first step, a natural cotton flattening step S1 is performed to process 100% natural cotton 10 into a felt-like form so as to have a predetermined width, breadth, and thickness.

The natural cotton 10 used in the above has excellent air permeability since fibers extracted from cotton plants are made into a cotton-like form and then manufactured into a planar felt-like form.

Next, in the second step, a mixed solution preparation step S2 is performed to impregnate the natural cotton 10 processed into the felt-like form.

The mixed solution 20 used in the above is comprised of an aqueous solution of animal glue, concentrated liquid of kelp, fertilizer, powder ore, and starch mixed at a predetermined ratio. A preferable mixing ratio of the mixed solution 20 is 33.3% by weight of animal glue, 33.3% by weight of concentrated liquid of kelp, 13.4% by weight of fertilizer, 13.4% by weight of powder ore, and 6.6% by weight of starch to water of 40 to 60° C.

The animal glue is mainly obtained from animal skins, bones, etc. so as to give mechanical properties, such as tensile force and elongation, to the natural cotton 10, and the concentrated liquid of kelp is prepared by extracting laminarin, which is an adhesive component generated by boiling kelp, so as to increase adhesion.

Further, as the fertilizer, a compound fertilizer containing two or more components among nitrogen, phosphoric acid, and potassium is used to gradually supply the fertilizer on the ground along with the natural decomposition of the mulching film, thus helping in plant growth. As the powder ore, a zeolite powder is used to make the powder ore adsorb pollutants, thus increasing the fertility of the soil. The starch obtained from sweet potatoes or the like is formed so as to increase the flexibility of the mulching film.

In the third step to be performed subsequently, an impregnation and molding step S3 is performed to impregnate the produced natural cotton 10 in the mixed solution 20 and then press it by a press roller 30.

In the above step, the natural cotton 10 is impregnated in a water cistern containing the mixed solution 20 so as to make the natural cotton 10 soaked with the mixed solution 20, and then it is pressed by a press roller 30, thereby allowing the animal glue, concentrate liquid of kelp, fertilizer, powder ore, and starch to be uniformly contained in the natural cotton 10.

Afterwards, in the fourth step which is the final step, a drying and winding step S4 is performed to dry the impregnated and pressed natural cotton 10 by a drier 40 and then wind it in a roll shape.

In the above step, the natural cotton 10 soaked with the concentrated liquid is fed to the drier 40 to remove moisture, thus completing the mulching film 1 in a felt-like form. Hence, effective components present in the mixed solution 20 remain between the voids of the natural cotton 10.

Additionally, the completely dried mulching film 1 is wound up in a roll shape to make storage and transport easier, and is easily installed on the ground.

The mulching film 1 of this invention manufactured in the above-described steps has a composition of an animal glue, concentrated liquid of kelp, fertilizer, powder ore, and starch distributed on the natural cotton 10 produced in a felt-like form at a predetermined ratio. The composition ratio is 10% by weight of animal glue, 10% by weight of concentrated liquid of kelp, 4% by weight of fertilizer, 4% by weight of powder ore, and 2% by weight of starch with respect to 70% by weight of natural cotton 10.

The mulching film of the present invention manufactured as above is mainly used for rice direct seeding, and the manufactured mulching film 1 is installed on the ground by using a tractor type machine and perforated at constant intervals, and rice seeds are seeded at the perforated positions by a direct seeding machine.

By the use of the above-described mulching film 1, rice can be directly seeded without any rice planting, thus making rice farming further easier, and even the operations of applying a fertilizer and removing weeds can be omitted.

INDUSTRIAL APPLICABILITY

The present invention involves a method for manufacturing a mulching film for rice direct seeding and a mulching film manufactured by the same method, and this mulching film can be applied as a mulching film for rice farming that can help in rice growth and suppress weed growth by manufacturing the mulching film in a nonfabric type containing a fertilizer for increasing rice growth and a powder ore for reinforcing the fertility of the soil and installing it in a paddy field.

The invention claimed is:

1. A method for manufacturing a functional mulching film for rice direct seeding, comprising:
a natural cotton flattening step (S1) of processing 100% natural cotton in a felt-like form so as to have a predetermined width, breadth, and thickness; a mixed solution preparation step (S2) of preparing a mixed solution comprised of 33.3% by weight of animal glue, 33.3% by weight of concentrated liquid of kelp, 13.4% by weight of fertilizer, 13.4% by weight of powder are, and 6.6% by weight of starch;
an impregnation and molding step (S3) of impregnating the produced natural cotton in the mixed solution and then pressing the same by a press roller; and a drying and winding step (S4) of drying the impregnated and pressed mulching film by a drier and then winding the same in a roll shape.

2. A mulching film for rice direct seeding, which is manufactured in a felt-like form and has 10% by weight of animal glue, 10% by weight of concentrated liquid of kelp, 4% by weight of fertilizer, 4% by weight of powder ore, and 2% by weight of starch uniformly distributed between the voids of natural cotton with respect to 70% by weight of natural cotton.

* * * * *